United States Patent [19]

Nichols et al.

[11] 4,033,742
[45] July 5, 1977

[54] METHOD FOR PRODUCING GLASS FIBERS

[75] Inventors: Claude R. Nichols, Glendora; Keith A. Helberg, Covina, both of Calif.

[73] Assignee: Kaiser Glass Fiber Corporation, Oakland, Calif.

[22] Filed: Feb. 13, 1976

[21] Appl. No.: 658,122

[52] U.S. Cl. .................................. 65/2; 65/5; 65/12; 65/16; 264/169; 425/72 R
[51] Int. Cl.$^2$ .................................. C03B 37/02
[58] Field of Search ............... 65/1, 2, 5, 12, 16; 425/72; 264/169

[56] References Cited

UNITED STATES PATENTS 3,905,790  9/1975  Strickland et al. ................. 65/2

Primary Examiner—Robert L. Lindsay, Jr.

[57] ABSTRACT

A cooling system for establishing and maintaining the running mode of a bushing used in production of glass fibers which embodies a heated orifice plate with closely spaced orifices and a bulk flow of upwardly directed gas (e.g., air), which cooling system comprises a series of opposing nozzles which provide a multiple air lance effect in starting up, clearing and maintaining the flow of individual glass fibers through each orifice.

6 Claims, 4 Drawing Figures

METHOD FOR PRODUCING GLASS FIBERS

BACKGROUND OF THE INVENTION

This invention relates to the production of glass fibers and more particularly to the production of glass fibers employing an orifice plate having closely spaced orifices.

The production of glass fibers employing an orifice plate having closely spaced orifices is described in detail in Strickland U.S. Pat. No. 3,905,790. According to the method therein described, the orifice plate with orifice plate heating means and closely spaced orifices is employed in conjunction with a bulk flow of rapidly moving gas, preferably air, directed upwardly at the orifice area in the plate. The bulk flow of gas which is a generally single column of gas at the cone and plate area, is employed in an amount, velocity and angle sufficient to cool the cones to provide stable cone formation and maintain separation of cones. The bulk flow of gas impinges on the plate essentially to eliminate stagnant gas adjacent the plate and flows outwardly along the orifice plate in all directions. The bulk flow of gas also provides a supply of gas to be sucked downwardly by the fibers which are drawn from the cones of molten glass which form beneath the orifices of the orifice plate.

As U.S. Pat. No. 3,905,790 indicates, start-up may be achieved by allowing the underside of the orifice plate to flood, establishing the temperature of the orifice plate at from about 25° to about 150° C below normal operating temperatures to restrict the flow of further glass through the orifice plate, and slowly withdrawing the matrix or monolith of glass which is formed beneath the orifice plate. As the monolith is slowly withdrawn, individual fiber-forming cones will tend to form at each orifice. The temperature of the orifice plate is then increased and the attenuation rate of the fiber is correspondingly increased with cone separation being maintained by the bulk air flow. This method is satisfactory but may require very careful operator attention, particularly with orifice plates having a larger number of orifices.

It is an object of this invention to provide an improved method of start-up for a heated orifice plate having closely spaced orifices that permits the running mode to be established in a short period of time.

It is another object of this invention to provide an improved method of clearing flooding of a heated orifice plate having closely spaced orifices that permits a rapid clearing of the flooded orifice plate.

It is a further object of this invention to provide a method of providing bulk gas flow for a heated orifice plate having closely spaced orifices that minimizes the volume of gas that is required.

It is yet another object of this invention to provide apparatus for start-up or for clearing flooding of a heated orifice plate having closely spaced orifices employing a gas delivery manifold that permits the running mode to be established in a short period of time.

It is still further an object of this invention to provide an apparatus for producing glass fibers from a heated orifice plate having closely spaced orifices employing a gas delivery manifold that minimizes the volume of gas that is required.

It is a still further object of this invention to provide a gas delivery manifold which may be employed both for clearing an orifice plate and for the production of glass fibers.

In one embodiment, this invention contemplates the method of establishing the running mode (i.e., either start-up or correction of flooding) of a glass fiber producing orifice plate having orifice plate heating means and closely spaced orifices comprising:

a. Permitting molten glass to flood the underside of the orifice plate;

b. Establishing the temperature of the orifice plate to provide a glass viscosity at the orifices of more than about 1000 poises;

c. Forming a matrix of glass on the underside of the orifice plate;

d. Directing cooling gas to the underside of said orifice plate from at least two sides of the orifice area at an angle of from about 30° to about 60° to said orifice plate from a plurality of generally opposed nozzles located closely adjacent said orifice area and which are directed generally to the center of the plate;

e. Slowly withdrawing said matrix of glass from said orifice plate while increasing the temperature of said orifice plate and regulating the flow of said cooling gas to form fiber-forming cones under at least some of the orifices in said orifice plate; and f. Slowly decreasing and increasing the flow of cooling gas, said decreases in gas flow being sufficient to permit isolated flooded areas to flow to adjacent fiber-forming cones and said increases in gas flow being sufficient to increase the viscosity of the glass to cause flooded areas to fiberize as fibers are drawn from adjacent fiber-forming cones.

In another embodiment of this invention generally opposed nozzles are employed to maintain the running mode. Such embodiment is directed to a method of forming glass fibers by a. passing separate streams of molten glass through an orifice plate having orifice plate heating means and having at least four rows of orifices therein, with orifices being spaced in flooding relationship;

b. drawing fibers from cones of molten glass formed at each said orifice; and c. directing a bulk flow of rapidly moving gas upwardly to the orifice area in said plate,
 i. to cool said cones to provide a stable cone formation and to maintain separation of cones thus preventing flooding;
 ii. to impinge on said plate essentially to eliminate stagnant gas adjacent said plate and to cause to move outwardly along said plate in all directions from said orifice area; and
 iii. to supply a source of gas sucked downwardly by the fibers and substantially eliminate ambient gas drawn into the region of the fiber cones, and contemplates the improvement comprising introducing cooling gas streams from at least two sides of said orifice area through generally opposed nozzles which impact below but closely adjacent to said orifice plate and create a turbulent bulk flow of upwardly moving gas at the cone and plate area.

An additional embodiment of this invention contemplates the use of generally opposed nozzles to establish the running mode and thereafter employing generally opposed nozzles to maintain the running mode.

Still further embodiments of the invention contemplate an apparatus for establishing the running mode including generally opposed nozzles directed generally to the center of the orifice area; an apparatus for maintaining the running mode including generally opposed nozzles directed to impact below the orifice plate and provide a turbulent flow of upwardly directed bulk air; and an apparatus including generally opposed nozzles which may be altered from the clearing position to the running position.

This invention provides a method and apparatus which may be used for the successful clearing of orifice plates having closely spaced orifices even though the orifice plate may contain a large number of orifices. It has been determined that the practice of this invention reduces the volume of cooling gas required as contrasted with nozzles mounted more vertically beneath the orifice plate. Moreover, the use of the method described herein permits clearing more expeditiously than with the use of more vertically mounted nozzles since the cooling gas has better access to the orifice plate as the monolith is pulled away.

This invention also provides a method and apparatus which utilizes a bulk flow of cooling gas to maintain the running mode of a glass fiber producing orifice plate having closely spaced orifices which minimizes the volume of cooling gas that is required.

The various embodiments of this invention are improvements in the production of glass fibers as described in U.S. Pat. No. 3,905,790.

Broadly, the method described in U.S. Pat. No. 3,905,790 may be practiced with any glass melting means including conventional glass furnaces and auxiliary equipment. The molten glass is maintained in a reservoir which is in communication with the orifice plate. Most often, the orifice plate will form the lower surface of the molten glass reservoir means and, indeed, the orifice plate can be formed as a bushing with the sides of the bushing extending upwardly into the furnace to form all or a portion of the sides of the reservoir which contains the molten glass.

The orifice plate itself may be made of any alloy acceptable for operation under glass fiber forming conditions and the surface of the orifice plate is generally flat. The orifices in the orifice plate are most often less than about 0.1 in. in diameter and may be as small as 0.02 in. in diameter. In order to obtain maximum utilization of bushing area, the orifices generally are spaced not more than about 2 diameters center:to:center, with spacings of about 1.25 to about 1.7 diameters, center:-to:center, being preferred. For practical production, orifice density generally will be at least about 50 orifices per sq. in., preferably at least about 100 orifices per sq. in., and most desirably about 200 orifices per sq. in. of the orifice area in the orifice plate. The orifice plates have at least four rows of orifices. preferably have at least about 10 or 11 rows of orifices, and most desirably have at least about 15 rows of orifices. The orifice plate configurations and assemblies described in copending applications Ser. No. 599,720 filed July 28, 1975 and Ser. No. 638,526, entitled Apparatus and Method for Controlling Flooding in the Drawing of Glass filed Dec. 8, 1975 are particularly suitable for use.

While a variety of cooling gases may be employed, air is particularly preferred. Since the gas is employed for cooling purposes it is preferred to employ gases having temperatures of about ambient temperature (e.g., about 100° F or less). The benefits can also be achieved by warmer gas which may be, for example, even at 500° F, providing the volume of gas is increased accordingly. For ease of presentation, this discussion will be couched in terms of air but it should be understood that other gases are also contemplated.

The orifice plate is equipped with orifice plates heating means so that the temperature of the orifice plate can be regulated independently of the heat transferred to the orifice plate from the molten glass. Most often such heating means are electrical resistance heating means although other means are also contemplated.

The fibers are drawn from the fiber forming cones on a collet, or the like, and may be coated with conventional dressing fluids, sizing compounds and the like. The method to which this invention is directed is fully discussed in U.S. Pat. No. 3,905,790, which is incorporated herein by reference, and that discussion will not be repeated at length here.

One of the essential means for achieving the above and other objects of this invention is the provision of an auxiliary gas cooling system for use in establishing the desired running mode of flat orifice plate bushings. This gas cooling system is auxiliary in the sense that it is in addition to, and desirably not in lieu of, the bulk air system which flows in a generally upward fashion to cool the flat orifice plate and the attenuated filaments moving downward in the conventional operation of the process embodied in U.S. Pat. No. 3,905,790. The auxiliary system in effect is a multiple air lance that expedites the establishment of the normal running mode of the bushing, either at start up or after a breakout during the course of a run. The method of the invention contemplates several air nozzles disposed at opposite sides along the length of the bushing and at the angles heretofore noted. The center line of the gas flowing from each nozzle exerts a cooling effect on the orifice plate as the matrix of glass drops or flows away from the plate face as flooding is being curtailed and terminated, all in the manner more fully described herein, and the jets of gas flow upwardly and in toward the center of the orifice plate. The multiplicity of nozzles projecting individual jets provide the multiple air lance effect heretofore noted. The air, or any other gas, can be directed at random along the length of the orifice plate to maintain a uniform temperature and cooling effect along the length of the plate. The invention is particularly useful for large bushings, that is, bushings in excess of 1000 orifices. For example, in bushings of 2000 orifices or more which are rectangular in shape and wherein there is relatively long dimension at the ends of which the current is fed to effect the heating of the bushing, such as is shown in the bushing assembly of FIG. 3 of the aforementioned Ser. No. 638,526, the ends of the orifice plate adjacent the current leads may in some instances be at a higher temperature than the midsection of the orifice plate. The nozzles can be readily adjusted to apply a greater cooling effect to the hotter ends to evenly cool the orifice plate along its length.

This auxiliary cooling system with its multiple air lance effect furnishes distinct advantages in starting up or clearing breakouts, particularly where substantial flooding is permitted to take place in the first instance, in that the time of the operator is substantially reduced in contrast to the time and cost for a single operator or multiple operators to clear the bushing manually with individual air lances. As the size of bushings increases, so also do the advantages flowing from the use of the multiple air lance. In fact, in some instances the need for an operator can be obviated entirely.

It is emphasized that the concept of opposing jets, particularly when intended to impact directly on the orifice plate of the bushing, constitutes a most advantageous embodiment of this invention when employed to establish the running mode of the bushing on start up or after a major flood where an extensive matrix of glass has been permitted to form. Nevertheless, very useful results can also be obtained in another embodiment of the invention as elsewhere described, where the center lines of opposing jets are permitted to impact against each other ahead of and before they reach the orifice plate. The effect of the impacting jets is to create an upward air flow onto the orifice plate.

Generally, where the jets of the auxiliary cooling system impact directly on the orifice plate and the running mode is established, the upward flow of bulk air is continued and the flow from the auxiliary system is terminated. However, the operator can continue the auxiliary flow if desirable.

In the embodiment of the invention involving impacting jets ahead of the orifice plate, it is possible to use the system, depending on the volume of air flow, to assist in establishing the running mode of the bushing. Also, if desired, it can be used as the source of bulk air flow or to augment the conventional bulk air flow of the process of U.S. Pat. No. 3,905,790.

In respect of the direction of air flow it is to be noted that in establishing the running mode of the bushing utilizing the multiple air lance effect of the auxiliary cooling system it is generally preferred to direct the opposing air nozzles so that the principal force of the respective jet is felt at the outer edges of the orifice plate and consequently the flooding effect giving rise to the matrix of glass tends to flow inward toward the center of the orifice plate. It is more desirable to concentrate the matrix in this manner where its weight is relied upon, at least in part, to encourage filament attenuation.

Although the angle of the opposing jets to the orifice plate has been discussed elsewhere, it is pertinent to note that the range of the angles can vary from about 30° to about 60°. Below about 30° the air tends to blow by and not impact on the plate or if impacting with an opposing jet the air will not have a sufficient upward moment to provide an effective upward flow. However, in the case of impacting jets, when one of the opposing jets is set as low as about 30° the immediate opposing jet should be at a greater angle. Also, it is desired practice that the nozzles from which the jets at the lower angles approaching about 30° are ejected should be on the same side as the operator so that the flow of heated air and gas from the vicinity of the orifice plate area after contact is away from the direction of the operator.

Another advantage of the auxiliary air cooling system, particularly the impacting jets, is that it aids in line drying of the fibers that may have been sprayed with cooling water.

DETAILED DESCRIPTION OF THE INVENTION

Figure 1:
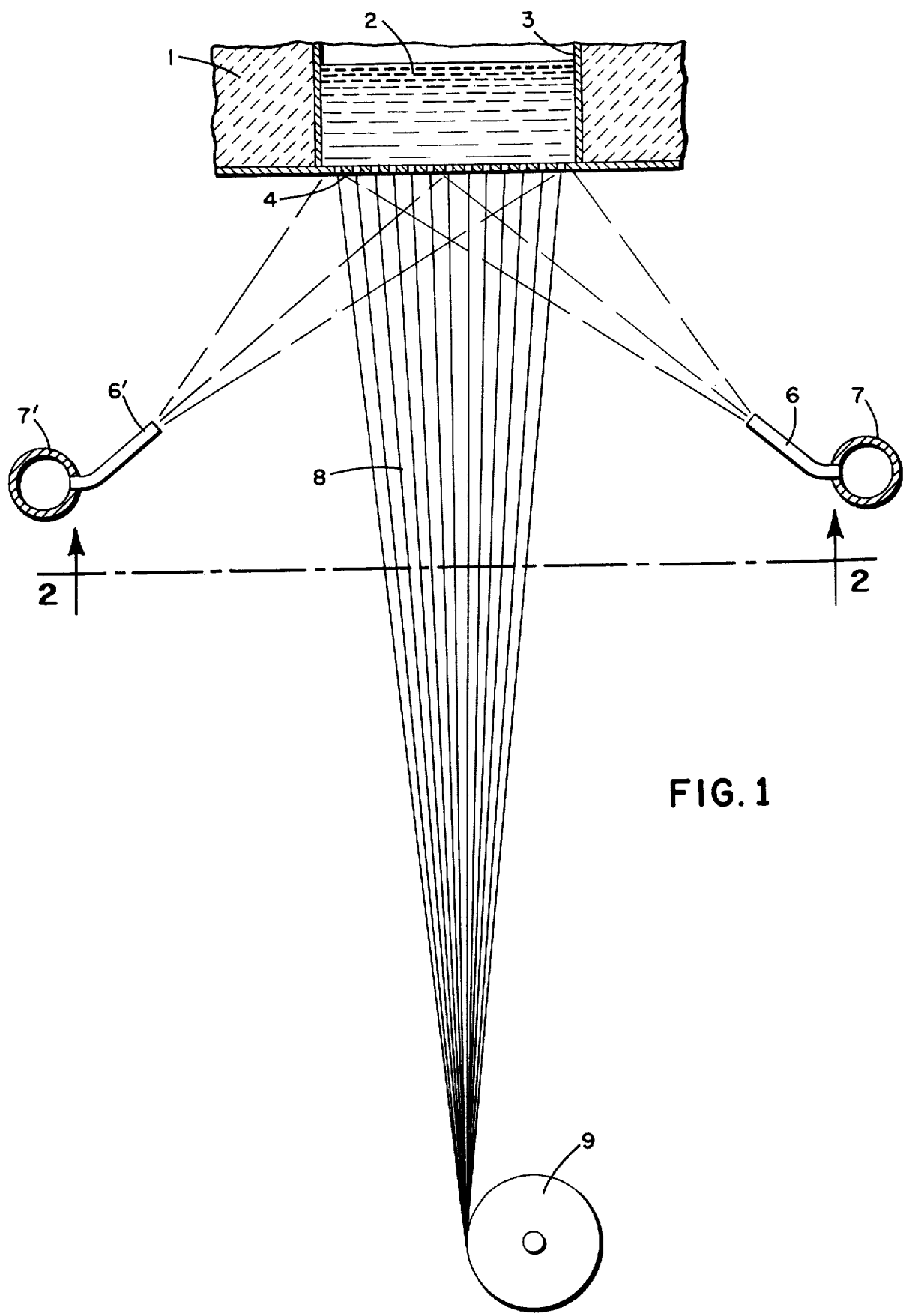
FIG. 1 is a schematic view of one embodiment of glass fiber production equipment employing the clearing air delivery manifold of this invention.
Figure 2:
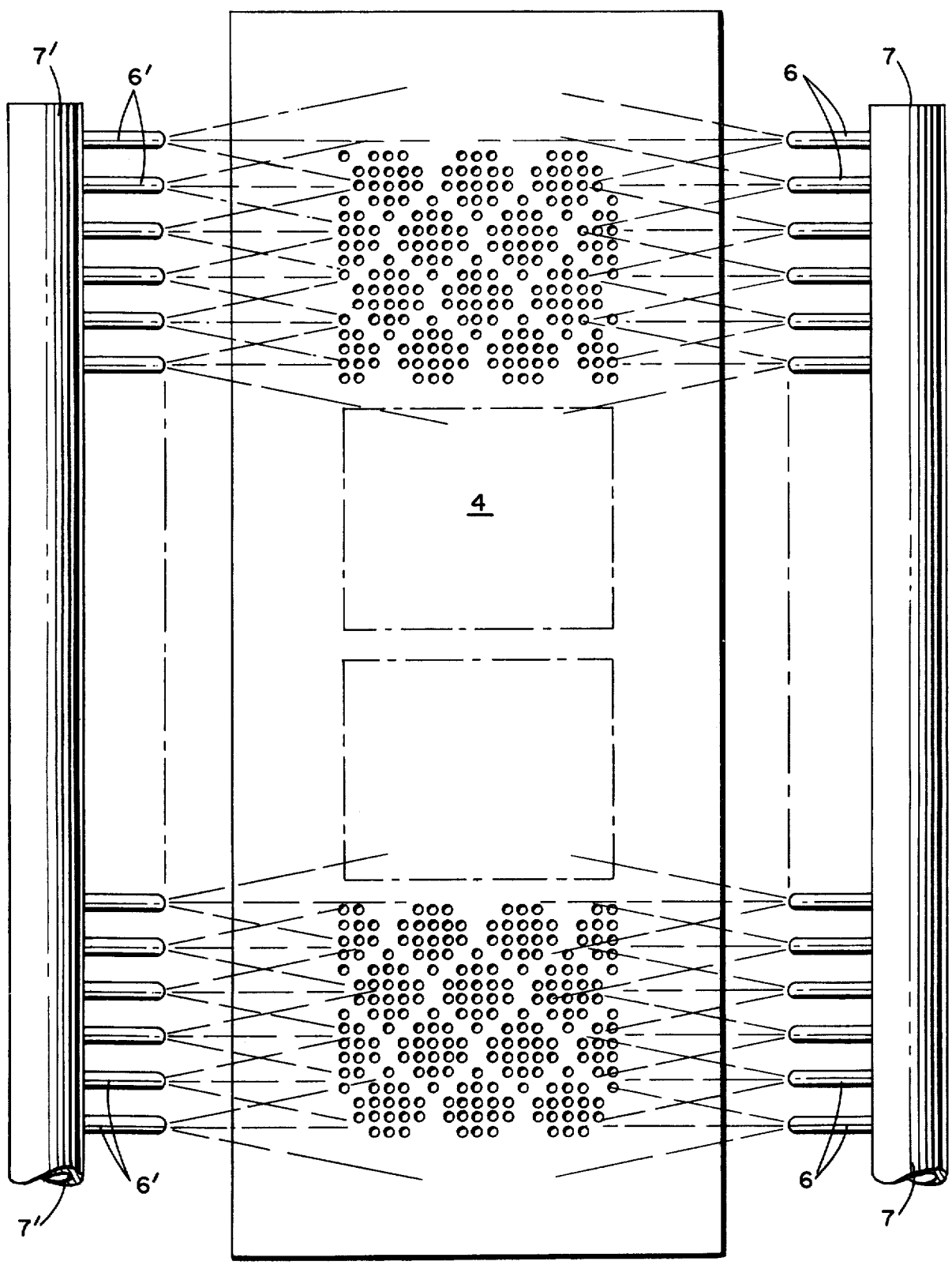
FIG. 2 is an enlarged sectional view taken along lines 2—2 of FIG. 1.

Referring to schematic FIG. 1 and sectional FIG. 2, the glass is melted in furnace 1 and a reservoir of molten glass 2 is maintained in reservoir means or bushing 3. The temperature of orifice plate 4 is controlled by electrical resistance heating means attached to the orifice plate.

Cooling air is introduced from at least two sides of the orifice plate through nozzles 6 and 6', which, in the apparatus shown, are connected to manifolds 7 and 7'. The nozzles are arranged in generally opposing relationship on two sides of the orifice area. The glass fibers 8 are drawn from the orifices and are wound on collet 9. Auxiliary equipment including sizing or dressing fluid applicators are not shown in FIG. 1.

FIG. 2 shows the arrangement of nozzles 6 and 6' in side-by-side relationship.

For establishing the running mode (i.e., start-up or clearing), the air is introduced at an angle of from about 30° to about 60° to the orifice plate. This angle permits as much cooling air as possible to reach the orifice plate over the edge of the glass monolith as the monolith moves away from the glass plate while at the same time maintaining a flow of air at the cone area. The air is directed generally at the center of the plate but may vary somewhat because of the fanning effet as the air leaves the nozzle. If over-cooling occurs at the edge of the orifice plate while the center is undercooled, the impact centers of the cooling air are separated to far outwardly from the center. On the other hand, if the air streams overlap too much, the edges will tend to become too hot. The air leaving the nozzles will, of course, increase in cross-section or fan out. The nozzles should be located relative to the orifice area so the cross-section of air flow at the orifice plate extends at least sufficiently to include the edge of the orifices nearest the nozzle. The air flow from all the nozzles should, of course, be of sufficient total cross-section at the orifice plate that it encompasses the entire orifice area. A preferred angle for the nozzles is from about 40° to about 50° to said orifice plate, while a particularly preferred angle is about 45°.

The use of nozzles, as contrasted for example to the use of an elongated slit, is important in order to maintain impact pressure while avoiding the use of excessive air. Generally nozzle diameter will range from about 1/32 in. to about 6/32 in. and are spaced sufficiently close to each other to obtain a substantially even flow of air along the orifice plate. Nozzles having a diameter of 1/16 in. spaced on ½ in. centers positioned about 3 in. from the center of the orifice area have successfully been employed for a 2000 hole orifice plate which was 1.65 in. wide and 8.3 in. long. The orifice area was 21 rows wide. Generally, the nozzles may be placed from about 2 to about 5 in. from the center of the orifice area. Representative air exit velocity at the nozzles ranges from about 100 to about 400 feet per second.

The present invention may be employed to establish the running mode at start-up according to the following procedure.

The orifice plate is heated sufficiently to cause flooding of the entire underside thereof and form a glass matrix or monolith. While it is not necessary, it is desirable to use cooling air assist the matrix to form more quickly. During this stage of start up the temperatures of the orifice plate will generally be from about 25° to about 150° C below normal operating temperatures and glass viscosities flowing through the orifices will be above about 100 poises. Normal operating temperature of an orifice plate for E glass, depending upon orifice diameter and desired throughput rate, will be within the range of from about 1150° to 1350° C. Operating temperatures for other types of glass will vary but such temperatures are well known to the art.

Inasmuch as the molten glass passing through the orifices must be fiberized, the viscosity of the glass in the fiber forming cone beneath the orifices from this point forward in the process should be within the normal fiberizing viscosity range of from about 300 to about 1000 poises, preferably from about 500 to about 700 poises.

After the monolith is formed, it is moved slowly away from the underside of the orifice plate. The movement of the monolith may be accomplished by mechanical means such as by tongs or a glass rod embedded in the monolith. Alternatively, but generally less desirably, the monolith can be permitted to fall of its own weight.

As the monolith moves away from the underside of the orifice plate the clearing air is employed and will begin to impact on the orifice plate itself and to assist clearing. Generally clearing will occur beginning at the edges of the orifice are nearest the clearing air sources. Because of normal manufacturing tolerances, minor variations in heat patterns and the like, however, some areas will fiberize while other isolated areas will remain flooded.

At this point, the air flow may be reduced somewhat. The reduced air flow will permit the viscosity of the molten glass in the isolated flood areas to decrease and become more fluid. As a result, these floods will tend to flow into adjacent cones from which fibers are being formed. At about the same time the air flow is first reduced, the temperature of the orifice plate is increased slowly and the increase in plate temperature continues until normal operating temperatures and viscosities are achieved.

When the flooded areas spread to adjacent fiber forming cones the cooling air is again increased. This increase in cooling air offsets the effect on the fiber forming comes of the increasing plate temperature and also provides sufficient cooling to increases the viscosity of the fiber forming cones so that enough tension can be applied to the fibers drawn from those cones to cause the adjacent flooded areas to fiberize.

In order to clear the remaining localized flooded areas, the air may be increased and decreased again with a typical cycle (i.e., one air increase to the next) taking from about 15 to about 20 seconds, although it should be understood that the time frequency may vary somewhat depending upon operating conditions. It can be expected that not all floods will be cleared with the first variation of air flow and that additional alternating increases and decreases in air flow can be employed. In the event a few small isolated flooded areas remain, a hand air lance may be employed to direct cooling air selectively to those areas as described below.

The above procedure has provided 80 – 90% clearing for a 2000 hole bushing in a period of only about one and one-half minutes. Once this condition has been achieved, bulk air, including the bulk air configuration described herein, can be employed to maintain the running mode. A hand air lance which permits a stream of cooling air to be directed to specific areas can be used to separate the remaining few flooded areas after the bulk air is turned on.

While the above description has been directed to the start-up of an orifice plate, essentially the same procedure can be employed if an operating orifice for some reason floods. In this latter instance, the temperature of the orifice plate is simply dropped 25° to about 150° C below operating temperatures and the above steps are repeated. By turning the operating air off after a flood begins to occur, the complete flooding desirable for restarting can be accelerated.

Figure 3:
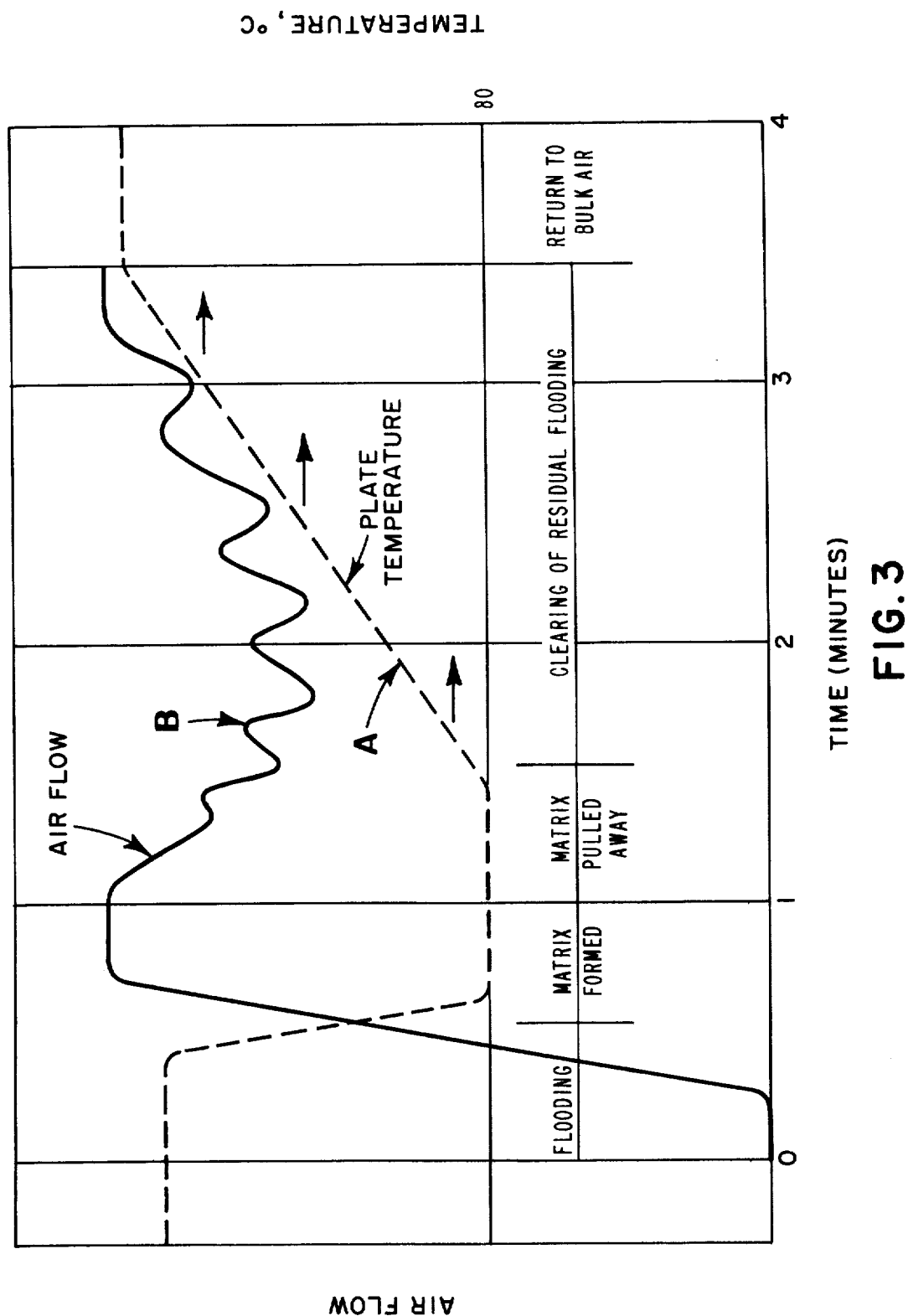
FIG. 3 is a schematic graph showing the variations in air velocities and orifice plate temperatures which occur when establishing the running mode.

A schematic representation of the variation in orifice plate temperatures (A) and air flow rates (B) during clearing is shown in FIG. 3. When a major flood occurs, the air flow is decreased to insure the entire orifice area floods. After the entire area is flooded, the plate temperature is decreased and the air flow is increased to assist in forming a matrix or monolith of glass. The matrix is then slowly pulled away from the orifice plate and the cooling air begins clearing. The air flow is then cycled to permit alternate spreading of glass in remaining flooded areas interspersed with periods of additional clearing. The plate temperature is slowly raised to normal and the air cycles continue until at least most of the flooded areas are cleared.

As noted earlier, auxiliary cooling air for separation is introduced along at least the two major sides of an orifice plate so as to attain a substantially even cooling effect. In the event an orifice plate has a hexagonal, circular or similar configuration and space permits, the cooling air is desirably introduced along the entire periphery of the orifice area and, again, directed generally at the center of the orifice area. The system can be adjusted so as to conform to the heat pattern of the orifice plate. It has been determined that during clearing the cones at the edges of the orifice area tend to be somewhat cooler than the cones at the center of the orifice area. Even though the cones at the center tend to be somewhat warmer, that fact does not adversely affect clearing. The clearing mode described above, however, is not satisfactory to provide the uniform cooling required for running conditions.

The use of generally opposed nozzles to maintain the running mode during production of glass fibers will now be described.

Figure 4:
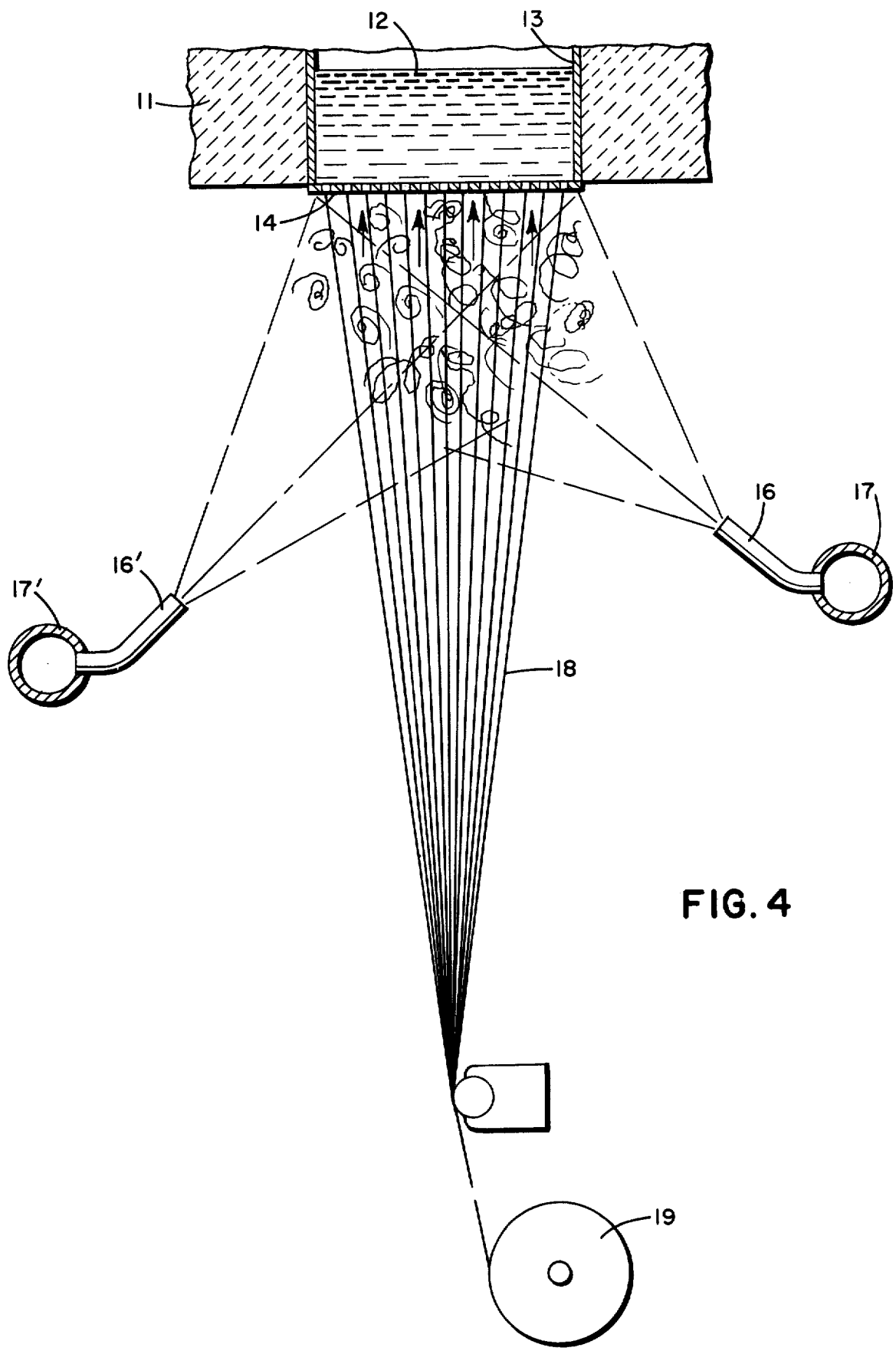
FIG. 4 is a schematic view of glass fiber production equipment employing the air delivery manifold of this invention in the running mode.

FIG. 4 is a schematic representation of the apparatus for use in the running mode for the production of glass fibers.

Referring to schematic FIG. 4, the glass is melted in furnace 11 and a reservoir of molten glass 12 is maintained in reservoir means or bushing 13. The temperature of orifice plate 14 is controlled by electrical resistance heating means (see Ser. No. 638,526) attached to the orifice plate.

Cooling air is introduced from at least two sides of the orifice plate through nozzles 16 and 16' which, in the apparatus shown, are connected to manifolds 17 and 17'. The nozzles are arranged in generally opposing relationship on two sides of the orifice area. The glass fibers 18 are drawn from the orifices and are wound on collet 19. Auxiliary equipment including sizing or dressing fluid applicators are not shown in FIG. 4.

For the running mode, the air is introduced through one set of the generally opposed nozzles at an angle of from about 30° to about 60° to the orifice plate. Pairs of opposing nozzles need not be at the same angle and, indeed, it has been found to be desirable that opposing nozzles be at somewhat different angles to minimize the amount of air which tends to "bounce back" into the operator's face. Good operating results have been achieved with one set of nozzles at an angle from about 40° to about 60+ and the other set of nozzles at a different angle within a range from about 30° to about 45° to the plate. A particularly preferred arrangement contemplates the use of one set of nozzles at an angle of about 45° to the plate and the opposing set of nozzles at an angle of about 40° to the orifice plate.

The centerline of the air stream from a nozzle is generally directed to about the far edge of the orifice area in the orifice plate. The air streams from the nozzle thereupon impact below the orifice plate to cause turbulence and to result in a bulk flow of air upwardly at the cone and orifice plate, as schematically shown in FIG. 4. The centerlines of the air streams issuing from opposed nozzles will generally intersect at a distance of not more than about 1 inch below the orifice plate. The area of turbulence created by the intersecting air streams should, of course, be at least as great as the area occupied by the orifices in the orifice plate.

As in the case of clearing, the nozzles are spaced sufficiently close to each other to obtain a substantially even flow of air along the edges of the orifice plate. The use of nozzles, as contrasted for example to the use of an elongated slit, is important for the running mode in order to maintain impact pressure and create turbulence while avoiding the use of excessive air. Substantially less cooling air is required for the running mode according to this invention as compared, for example, to the use of more vertically oriented nozzles mounted at an angle of about 80° to the orifice plate. Indeed, cooling air volume can be reduced on the order of about one-half because the nozzles are closely adjacent the orifice area.

Generally nozzle diameter will range from about 1/32 in. to about 6/32 in. and are spaced sufficiently close to each other to obtain a substantially even flow of air along the orifice plate. Nozzles having a diameter of 1/16 in. spaced on ½ in. centers positioned about 3 in. from the center of impact at the orifices area have successfully been employed for a 2000 hole orifice plate which was 1.65 in. wide and 8.3 in. long. The orifice area was 21 rows wide. In general, the nozzles may be placed from about 2 to about 5 in. from the center of the orifice area. Representative air exit velocity at the nozzle range from about 50 to about 200 feet per second.

Once again, cooling air for separation has been described as being introduced so as to attain a substantially even heat pattern along the two major sides of an orifice plate. In the event an orifice has a hexagonal, circular or similar configuration and space permits, the cooling air is desirably introduced along the entire periphery of the orifice area and, again, directed so that the centerline of the streams will intersect below the orifice plate but within about 1 inch of the orifice plate to create the desired bulk flow.

While an air manifold may be designed solely for clearing or may be designed solely for the running mode, this invention also contemplates apparatus with nozzles that are adjustable and can be used both for clearing and for the running mode.

The following specific examples are included for illustrative purposes only and are not intended to limit the scope of the invention.

EXAMPLE 1

A molten bath of E glass having a bulk temperature of about 2300° F was established over an orifice plate assembly as shown in copending application Ser. No. 638,526 filed Dec. 8, 1975. The orifice plate was made of platinum and contained 2068 orifices having a diameter of 0.052 in. and spaced centers that varied from 0.065 to 0.080 in. The orifice area was 21 rows wide and occupied an area 1.65 in. wide and 8.3 in long.

A clearing manifold was mounted on each of the long sides of the orifice area. Each manifold contained 16 nozzles having about a 0.063 in. inside diameter. Pairs of nozzles were mounted on 0.5 in. centers with 0.63 in. spacing between pairs to accommodate reinforcing ribs in the orifice plate. The nozzles were at an angle of about 45° to the orifice plate and the nozzle outlets were about 3 in. from the center of the plate. The centerline of the air stream of the nozzles was aimed at about the center of the orifice area in the orifice plate.

The orifice plate was allowed to flood and the temperature of the plate was reduced about 50° C (a reduction of 50°–80° F measured about ½ in. up on a flange which defined a sidewall of the reservoir). The cooling air was employed at a manifold pressure of 4–12 psig.

The matrix of glass was pulled slowly from the plate and the air was cycled at about 15 second intervals as the orifice plate temperature was slowly increased to its normal operating temperature of about 2265° F. The matrix and then the fibers were initially hand pulled from the orifice plate until operating orifice plate temperature was reached and, thereafter, the fibers were pulled by a pull roll. About 80% separation was achieved after only about 3 cycles of the clearing air and after only about 1½ minutes. At that point bul air was introduced onto the plate and the remaining flooded areas were cleared with a hand air lance within about another 2½ minutes. The bulk air was introduced from 12¼ I. D. nozzles on 0.7 in. centers mounted 9 in. below the plate and at an angle of about 80° to the plate. The manifold pressure for the bulk air was about 1.5 pounds.

In clearing floods on numerous occasions, the air was often cycled from 2 to 4 times to provide 80% clearing of floods. On other occasions, the floods were entirely cleared with the auxiliary cooling system.

EXAMPLE 2

Employing the orifice assembly and molten glass bath of Example 1, glass fibers were producted utilizing opposed nozzles to provide a bulk air flow. The manifold nozzle spacings and size were the same as employed in Example 1. The nozzle outlets on one side were at an angle of about 45° to the orifice plate. The opposing nozzle outlets were at an angle of about 30° to the orifice plate.

The centerline of the air streams were directed at the far edge of the orifice area and the centerlines of the streams intersected within 1 in. below the orifice plate. Employing a manifold pressure of about 3 psig., a bulk flow of air was established which maintained cone separation and permitted the production of glass fibers.

Because less cooling air was employed, it was found to be desirable to spray the formed and solidified fibers with a water spray to cool them to about ambient temperature.

Although the foregoing description and the examples have been directed to glass, it should be understood that the invention is not necessarily limited to use with glass. The process and apparatus disclosed herein can also be used in the manufacture of ceramic fibers which have processing properties similar to glass. These may include fibers containing various metal oxides, for example alumina borosilicate, alumina silica, zirconi-silica, and the like. the bushing and the orifice plate, of course, should be made of an alloy or other material capable of withstanding the elevated temperatures of the various types of ceramic material which can be formed into fiber. The invention is not intended to be limited to the specifics of the described embodiments, but rather is defined by the following claims.

What we claim is:

1. The method of establishing the running mode of a glass fiber producing orifice plate having orifice plate heating means and closely spaced orifices comprising:
   a. permitting molten glass to flood the underside of the orifice plate;
   b. establishing the temperature of the orifice plate to provide a glass viscosity at the orifices of more than about 1000 poises;
   c. forming a matrix of glass on the underside of the orifice plate;
   d. directing cooling gas to the underside of said orifice plate from a plurality of nozzles located along each of at least two sides of the orifice area, said nozzles being at an angle of from about 30° to about 60° to said orifice plate, being in generally opposed relationship, being closely adjacent said orifice area, and being directed generally to the center of the plate, said cooling gas flow having a total cross-section at the orifice plate at least as large as the area occupied by orifices;
   e. slowly withdrawing said matrix of glass from said orifice plate while increasing the temperature of said orifice plate and regulating the flow of said cooling gas to form fiber-forming cones under at least some of the orifices in said orifice plate; and
   f. periodically slowly decreasing and increasing the flow of cooling gas over the entire orifice area, said decreases in gas flow being sufficient to permit isolated flooded areas to flow to adjacent fiber forming cones and said increases in gas flow being sufficient to increase the viscosity of the glass to cause flooded areas to fiberize as fibers are drawn from adjacent fiber forming cones to progressively clear additional portions of the orifice area with each variation.

2. The method of claim 1 wherein said nozzles are located around the entire periphery of said area occupied by orifices in said orifice plate.

3. The method of establishing and maintaining the running mode of a glass fiber producing orifice plate having orifice plate heating means and closely spaced orifices comprising:
   a. permitting molten glass to flood the underside of the orifice plate;
   b. establishing the temperature of the orifice plate to provide a glass viscosity at the orifices of more than about 1000 poises;
   c. forming a matrix of glass on the underside of the orifice plate;
   d. directing cooling gas to the underside of said orifice plate from a plurality of nozzles located along each of at least two sides of the orifice area, said nozzles being at an angle of from about 30° to about 60° to said orifice plate, being in generally opposed relationship, being closely adjacent said orifice area, and being directed generally to the center of the plate, said cooling gas flow having a total cross-section at the orifice plate at least as large as the area occupied by orifices;
   e. slowly withdrawing said matrix of glass from said orifice plate while increasing the temperature of said orifice plate and regulating the flow of said cooling gas to form fiber-forming cones under at least some of the orifices in said orifice plate;
   f. periodically slowly decreasing and increasing the flow of cooling gas over the entire orifice area, said decreases in gas flow being sufficient to permit isolated flooded areas to flow to adjacent fiber forming cones and said increases in gas flow being sufficient to increase the viscosity of the glass to cause flooded areas to fiberize as fibers are drawn from adjacent fiber forming cones to progressively clear additional portions of the orifice area with each variation; and
   g. adjusting said nozzles so that the cooling gas streams impact below but closely adjacent to said orifice plate to create a turbulent bulk flow of upwardly more gas at the cone and plate area, whereby cone separation is maintained.

4. The method of claim 1, wherein said nozzles are at an angle of about 45° to said orifice plate.

5. The method of claim 1, wherein said nozzle outlets are located on two sides of said orifice area at a distance of from about 2 to about 5 inches from the center of said orifice area.

6. The method of claim 1, wherein said nozzles have an inside diameter of from about 1/32 to about ½ in.

* * * * *